(12) United States Patent
Carlson et al.

(10) Patent No.: US 8,753,008 B2
(45) Date of Patent: Jun. 17, 2014

(54) PROTECTIVE ENCLOSURE FOR A THERMAL IMAGING DEVICE OF AN INDUSTRIAL MONITORING SYSTEM

(75) Inventors: Paul S. Carlson, Santa Cruz, CA (US); Mathew N. Rekow, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 1131 days.

(21) Appl. No.: 12/492,362

(22) Filed: Jun. 26, 2009

(65) Prior Publication Data
US 2010/0329306 A1   Dec. 30, 2010

(51) Int. Cl.
*G01K 1/08* (2006.01)
*G01J 5/00* (2006.01)
*G01J 5/06* (2006.01)

(52) U.S. Cl.
USPC ......... 374/208; 374/420; 374/141; 250/338.1

(58) Field of Classification Search
USPC ......... 374/120–121, 130–131, 208, 100, 141, 374/2; 250/338.1; 356/43
See application file for complete search history.

(56) References Cited

U.S. PATENT DOCUMENTS

| | | | | |
|---|---|---|---|---|
| 2,745,028 | A | * | 5/1956 | Ford ............................. 310/104 |
| 4,113,137 | A | * | 9/1978 | Wind ............................ 220/319 |
| 4,495,731 | A | * | 1/1985 | Sears ............................. 49/402 |
| 4,634,294 | A | | 1/1987 | Christol et al. |
| 5,066,142 | A | * | 11/1991 | DeFrank et al. .............. 374/208 |
| 5,793,522 | A | | 8/1998 | Brun |
| 6,332,090 | B1 | * | 12/2001 | DeFrank et al. .............. 600/474 |
| 6,707,044 | B2 | | 3/2004 | Lannestedt et al. |
| 7,329,869 | B2 | | 2/2008 | Cassel et al. |
| 7,332,720 | B2 | * | 2/2008 | Minarik et al. ............... 250/352 |
| 7,454,050 | B2 | * | 11/2008 | Garvey ......................... 382/141 |
| 7,537,378 | B2 | * | 5/2009 | Sekine et al. ...................... 374/5 |
| 7,682,073 | B2 | * | 3/2010 | Kraus ............................ 374/132 |
| 7,742,365 | B2 | * | 6/2010 | Moteki et al. ................. 368/269 |
| 7,758,239 | B2 | * | 7/2010 | Ignatowicz .................... 374/139 |
| 7,965,336 | B2 | * | 6/2011 | Bingle et al. .................. 348/374 |
| 2003/0146385 | A1 | | 8/2003 | Zheng et al. |
| 2010/0033857 | A1 | * | 2/2010 | Filipiak ......................... 359/872 |
| 2013/0160373 | A1 | * | 6/2013 | Holliday ......................... 49/386 |

FOREIGN PATENT DOCUMENTS

| | | |
|---|---|---|
| DE | 19637946 A1 | 3/1997 |
| EP | 0913675 A1 | 6/1999 |
| JP | 05103255 A * | 4/1993 |
| WO | 94/00950 | 1/1994 |

OTHER PUBLICATIONS

EP 10251072, Partial European Search Report dated Oct. 15, 2010.

(Continued)

*Primary Examiner* — Gail Verbitsky
(74) *Attorney, Agent, or Firm* — Fredrikson & Byron, P.A.

(57) ABSTRACT

A thermal imaging device, which may be incorporated in an industrial monitoring system, is contained and protected by an enclosure that includes a window assembly. The window assembly includes a removable window and a temperature sensor, wherein the window provides a passage for infrared radiation to the imaging device, within the enclosure, and the temperature sensor is positioned, within the enclosure, for measuring a temperature of the removable window, and is adapted to communicate with circuitry of the imaging device. The window assembly may further include a removable retaining ring and a mounting plate. The mounting plate may include a bezel and an outer shoulder formed in a first side thereof, wherein the bezel receives the removable window and the outer shoulder receives the retaining ring, so that the retaining ring may hold the window against the bezel.

21 Claims, 4 Drawing Sheets

(56) References Cited

OTHER PUBLICATIONS

EP 10251072, Extended European Search Report dated Sep. 20, 2011.

Brochure: Marathon MM, MR, FA, FR, "Noncontact Temperature Measurement for Industrial Applications", (c) 2008 Raytek Corporation (3112321Rev. G) Feb. 2008.

U.S. Appl. No. 12/196,136, "Thermal Instrument Engine", filed Aug. 21, 2008.

* cited by examiner

PROTECTIVE ENCLOSURE FOR A THERMAL IMAGING DEVICE OF AN INDUSTRIAL MONITORING SYSTEM

TECHNICAL FIELD

The present invention pertains to thermal imaging and more particularly to a protective enclosure for a thermal imaging device of an industrial monitoring system.

BACKGROUND

Industrial monitoring systems often employ thermal, or infrared (IR), imaging devices, which are preferably mounted in a fixed location to capture IR images of a target, which may be a particular portion of a piece of manufacturing equipment and/or a product in the midst of a manufacturing process. These devices are typically adapted to communicate with a remote monitoring station and, in some instances, are integrated with process control packages.

In harsh or relatively hot industrial environments it is often necessary to contain these imaging devices within a protective enclosure that keeps the device cool and free of contamination such as dust particles. The enclosure necessarily includes a window through which the thermal imaging device can view the target in the environment over a period of time.

BRIEF DESCRIPTION OF THE DRAWINGS

The following drawings are illustrative of particular embodiments of the invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments of the invention.

Figure 1:
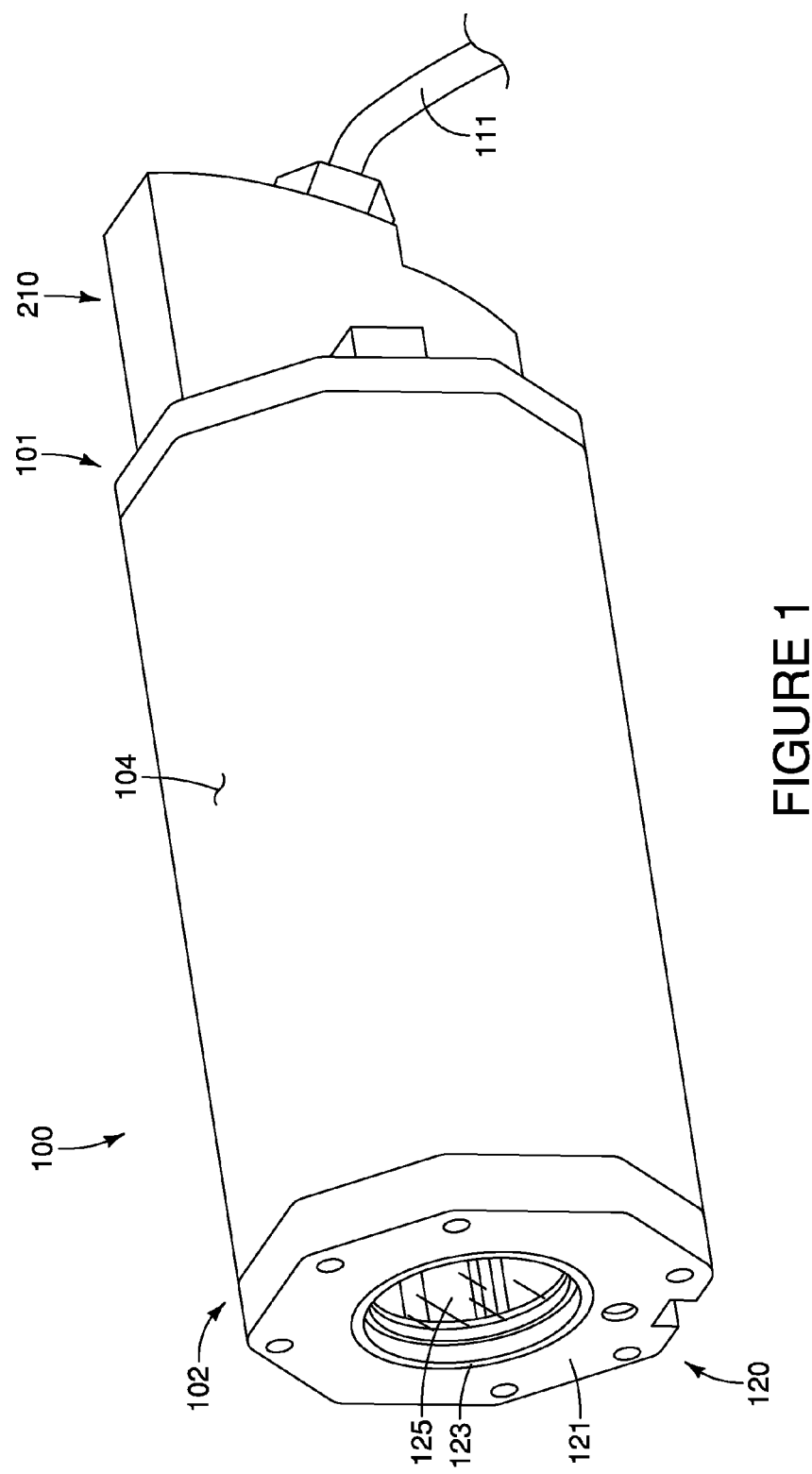
FIG. 1 is a perspective view of protective for a thermal imaging device, according to some embodiments of the present invention.
Figure 2:
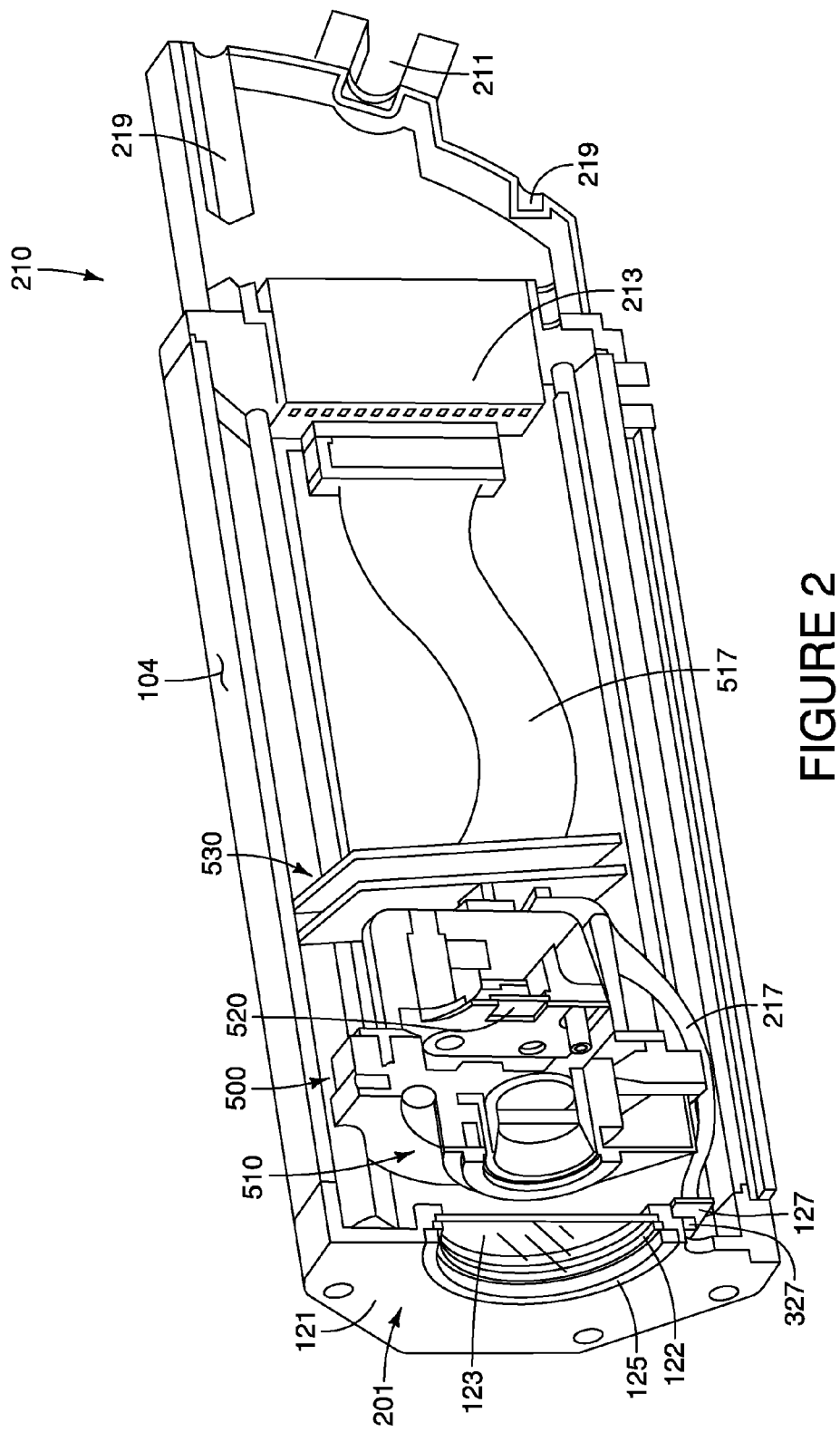
FIG. 2 is a perspective cross-section view of the enclosure of FIG. 1 and a thermal imaging device contained within the enclosure, according to some embodiments.

FIG. 1 is a perspective view of a protective enclosure 100, according to some embodiments of the present invention; enclosure 100 is adapted to protect an enclosed device from contamination from a surrounding environment. FIG. 2 is a cross-section view showing a thermal imaging device 500 enclosed within enclosure 100, according to some embodiments. Enclosure 100 may be surrounded by an active cooling accessory (not shown), for example, formed from cast aluminum and including internal copper pipes for the circulation of a coolant, which may maintain a specified internal temperature. Thermal imaging device 500 is shown as an IR camera module that includes an optics assembly 510, an IR focal plane array (FPA) of microbolometer detector elements 520, and electronics 530, which have the capability to convert the raw IR radiation detected by FPA 520 to temperature and digital image data, according to methods known to those skilled in the art. Optics assembly 510 is shown mounted in a flange which is coupled to a heat sink structure in which FPA 520 and associated components are held. Electronics 530 are shown mounted on a plurality of stacked printed circuit boards, which are coupled to a connector 213 of an electrical feedthrough assembly 210, via a flex circuit 517. Connector 213 may be coupled to a cable conductor 111 (FIG. 1), which extends out from enclosure 100, via a passageway 211 (FIG. 2) to a remote monitoring station. Alternatively, electronics 530 may communicate wirelessly with the remote station, according to methods known to those skilled in the art.

FIGS. 1-2 illustrate enclosure 100 including a sidewall 104 that surrounds thermal imaging device 500; electrical feedthrough assembly 210 is shown attached to a first end 101 of sidewall 104, and a window assembly 120 is shown attached to a second end 102 of sidewall 104. FIGS. 1-2 further illustrate window assembly 120, which, according to some embodiments, includes a mounting plate 121, a removable window 123, a removable retaining ring 125, a seal member 122, and a temperature sensor 327 mounted on a printed circuit board 127. According to embodiments of the present invention, enclosure 100 is adapted to be mounted at a fixed site in an industrial environment, with window assembly 120 directed toward a target, so that imaging device 500 may monitor the target through window 123. Feedthrough assembly 210 is shown including mounting slots 219, to receive mounting bolts, which are located on either side of passageway 211 for cable conductor 111.

Since enclosure 100 protects device 500 from extreme temperatures, as mentioned above, window 123 may be heated, by the ambient environment, to a temperature that is significantly higher than that of device 500 within protective enclosure 100, for example, approximately 10° C. to approximately 30° C. higher. If the emissivity of window 123 is greater than approximately 0.1 to 0.2, window 123, heated as such, may emit enough radiation to add to the radiation which is emitted from the target and detected by FPA 520, and to thereby introduce an error, for example, as high as 5-10%, into the temperature and digital image data generated by device 500. According to some preferred embodiments, window 123 is formed from silicon, which is approximately 2 mm thick and has an emissivity of approximately 0.3; according to alternate embodiments, window 123 is formed from a thinner and less expensive plastic. In order to compensate for radiation emission from window 123, temperature sensor 327 measures a temperature of window 123, and circuit board 127 transmits the temperature data to the electronics of device 500 as input to a correction term of a calibration algorithm programmed therein. Although FIG. 2 illustrates a flex circuit 217 connecting circuit board 127 to the circuitry of device 500, communication therebetween may alternately be wireless, according to methods known to those skilled in the art.

Figure 3:
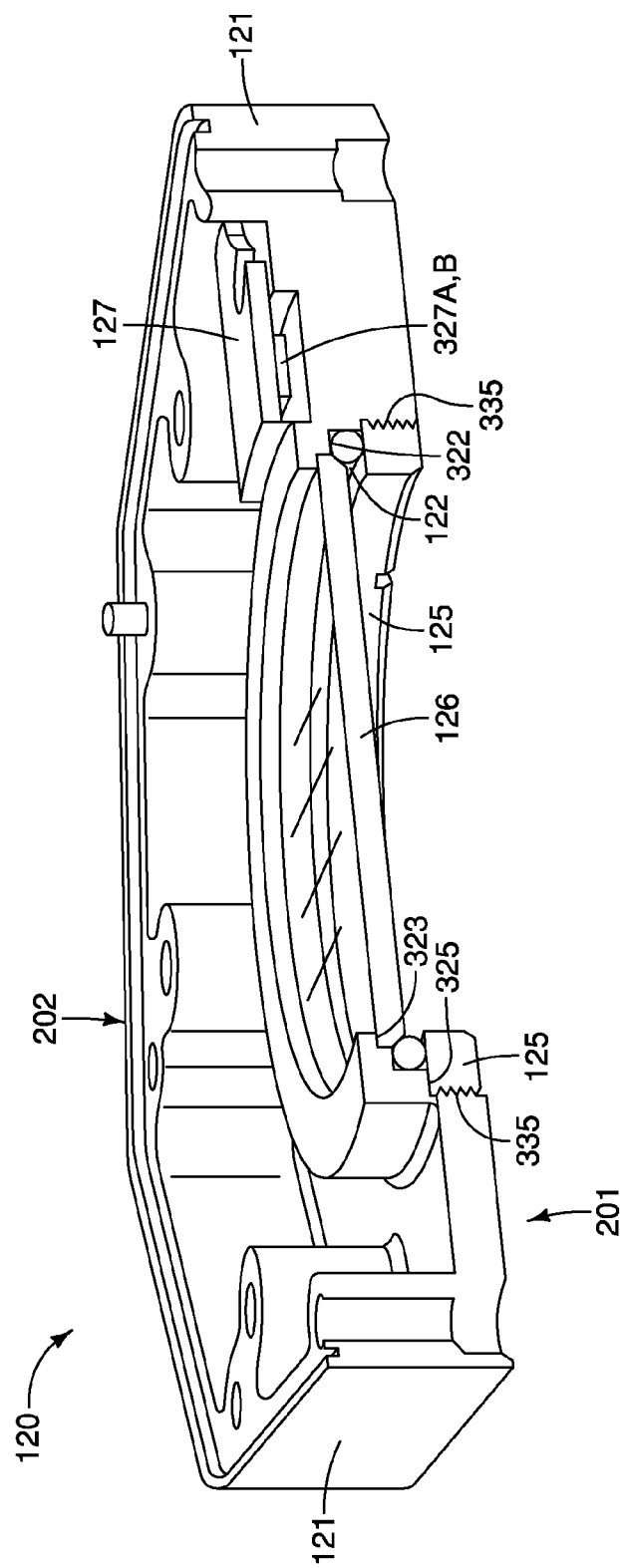
FIG. 3 is a perspective cross-section view of a window assembly of the enclosure shown in FIG. 1, according to some embodiments.

FIG. 3 is a perspective cross-section view of window assembly 120, which is shown separated from the rest of enclosure 100. FIG. 3 illustrates mounting plate 121 of assembly 120 including a rim, or bezel 323, and an outer shoulder 325, which are both formed in a first side 201 of plate 121. Bezel 323 is shown receiving removable window 123, and outer shoulder 325 is shown receiving removable retaining ring 125, such that retaining ring 125 holds window 123 against bezel 323. FIG. 3 further illustrates a seal member 122, for example, an elastomeric O-ring, which is interposed between retaining ring 125 and window 123, and an optional inner shoulder 322, which surrounds bezel 323 to receive seal member 122. According to the illustrated embodiment, retaining ring 125 may be removed, for example, via rotational disengagement at a threaded interface 335 with mounting plate 121, so that seal 122 and/or window 123 may be removed and replaced with a new counterpart, for example, after wear and/or damage thereto.

FIG. 3 further illustrates circuit board 127 attached to a second side 202 of mounting plate 121 so as to position temperature sensor 327 for measuring the temperature of window 123. Temperature sensor 327 may be one of two types: either a direct contact type 327A, for example, a resistance temperature detector (RTD) or thermistor, or a non-contact type 327B, for example, an IR sensor. It should be noted that temperature sensor 327 need not necessarily be mounted on a circuit board, according to alternate embodiments.

According to preferred embodiments of the present invention, when retaining ring 125 is received by outer shoulder 325, and window 123 by bezel 323, retaining ring 125 holds window 123 in thermal conductive contact with mounting plate 121 so that temperature sensor 327 can measure the temperature of window 123 by sensing the temperature of mounting plate 121. A relatively high thermal conductivity of silicon, the preferred material for window 123, allows for such a configuration. Mounting plate 121 and retaining ring 125 may be formed from aluminum.

Figure 4:
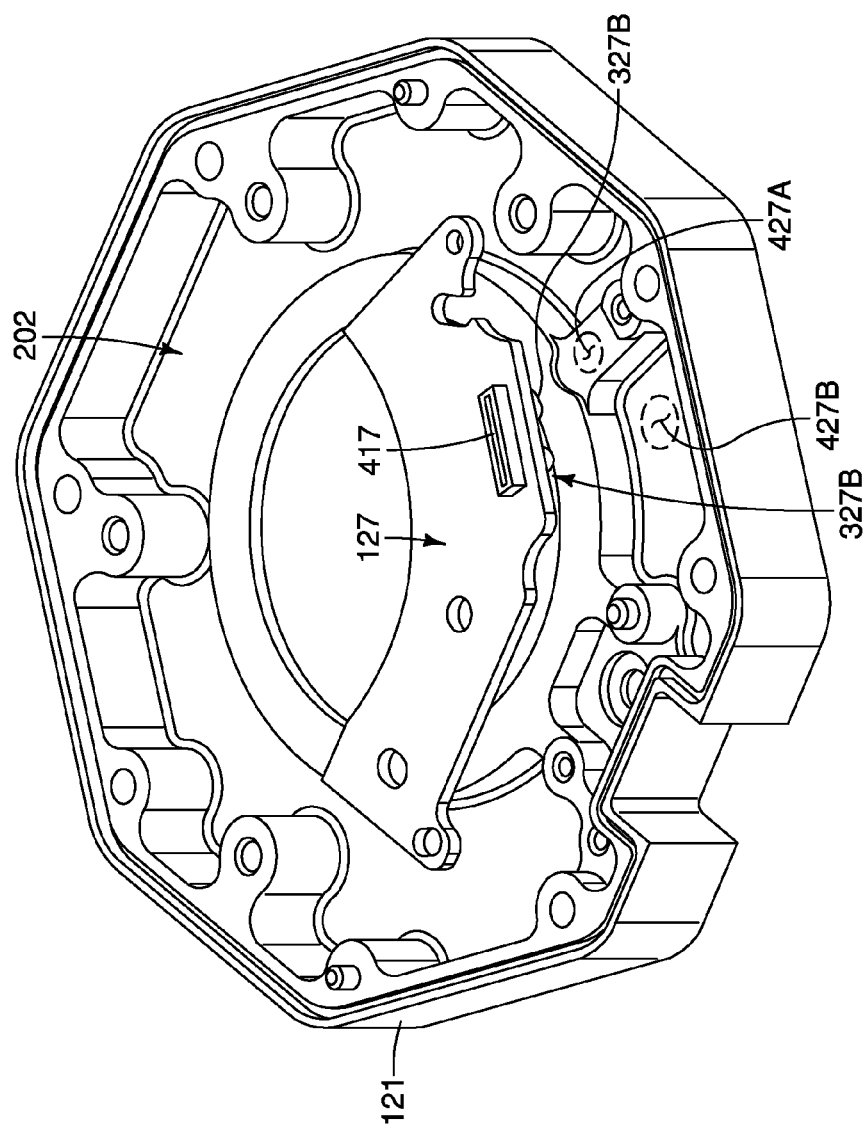
FIG. 4 is an exploded perspective view of the window assembly shown in FIG. 3, according to some embodiments.

Turning now to FIG. 4, which is an exploded perspective view of window assembly 120, second side 202 of mounting plate 121 is shown including a first portion 427A, with which the first type of temperature sensor 327A comes into thermal conductive contact, when circuit board 127 is attached to second side 202, and a second portion 427B, across from which the second type of temperature sensor 327B is positioned to receive IR radiation therefrom, when circuit board 127 is attached to second side 202. According to some alternate embodiments, if window 123 is formed from a material having a lower thermal conductivity than silicon, for example, a plastic material, window 123 may include an opaque region and circuit board 127 may be attached to second side 202 so as to position the second type of temperature sensor 327B opposite the opaque portion, in order to receive IR radiation therefrom. Alternatively, first type of temperature sensor 327A may be positioned to directly contact window 123. According to these alternate embodiments, window 123, when received by bezel 323, need not be held in thermal conductive contact with mounting plate 121. FIG. 4 further illustrates a connector 417 for coupling temperature sensor 327A or 327B to flex circuit 217 (FIG. 2).

Thus, with reference to the foregoing detailed description, it may be appreciated that window assembly 120, when attached to end 102 of enclosure sidewall 104, can allow for the passage of IR radiation, from an outside target, into enclosure 100, for detection by device 500, while maintaining the protective nature of enclosure 100, and further provides a correction, via one of two types of temperature sensors 327A, 327B, in order to compensate for radiation emitted from window 123. Furthermore, the configuration of window assembly 120 allows for removal and replacement of window 123, and/or seal member 122, without a significant and disruptive maintenance procedure.

In the foregoing detailed description, the invention has been described with reference to specific embodiments. However, it may be appreciated that various modifications and changes can be made without departing from the scope of the invention as set forth in the appended claims.

The invention claimed is:

1. A protective enclosure for a thermal imaging device, comprising:
 a mounting structure for securing the thermal imaging device in a fixed location;
 a sidewall surrounding the imaging device;
 a window assembly including a removable window and a temperature sensor, the window providing a passage for infrared radiation to the imaging device within the enclosure, and the temperature sensor for measuring a temperature of the window, when the window is received in the window assembly, and being adapted to communicate with circuitry of the imaging device;
 the window assembly further includes a removable retaining ring and a mounting plate attached to an end of the sidewall; and
 the mounting plate includes a first side facing outward, a second side facing inward, a bezel formed in the first side, and an outer shoulder also formed in the first side and surrounding the bezel, the bezel for receiving the removable window, and the outer shoulder for receiving the retaining ring, such that the retaining ring holds the window against the bezel.

2. The enclosure of claim 1, wherein the removable window comprises silicon.

3. The enclosure of claim 1, wherein the removable window comprises plastic.

4. The enclosure of claim 1, wherein the temperature sensor comprises a direct contact type temperature sensor.

5. The enclosure of claim 1, wherein the temperature sensor comprises a non-contact type temperature sensor.

6. The enclosure of claim 1, wherein the window assembly further includes a removable seal member sized to be interposed between the retaining ring and the removable window, when the window is received by the bezel and the retaining ring is received by the outer shoulder.

7. The enclosure of claim 6, wherein the mounting plate further includes an inner shoulder surrounding the bezel and being surrounded by the outer shoulder, the inner shoulder for receiving the seal member.

8. The enclosure of claim 1, wherein:
 the retaining ring, when received by the outer shoulder, holds the removable window in thermal conductive contact with the mounting plate, when the window is received by the bezel;
 the temperature sensor comprises a direct contact type temperature sensor; and
 the temperature sensor is mounted on a circuit board, the circuit board being attached to the second side of the mounting plate so as to position the temperature sensor in thermal conductive contact with a portion of the second side of the mounting plate.

9. The enclosure of claim 1, wherein:
 the retaining ring, when received by the outer shoulder, holds the removable window in thermal conductive contact with the mounting plate, when the window is received by the bezel;
 the temperature sensor comprises a non-contact type temperature sensor; and
 the temperature sensor is mounted on a circuit board, the circuit board being attached to the second side of the mounting plate so as to position the temperature sensor to receive infrared radiation from a portion of the second side of the mounting plate.

10. A window assembly for a protective enclosure of a thermal imaging device, the window assembly comprising:

a removable window;

a removable retaining ring;

a mounting plate including a first side, a second side, a bezel, and an outer shoulder surrounding the bezel, the bezel and the outer shoulder being formed in the first side of the mounting plate, the bezel for receiving the removable window, and the outer shoulder for receiving the retaining ring, such that the retaining ring holds the window against the bezel, the mounting plate adapted to be fixedly attached to an end of the protective enclosure, such that the first side faces outward from the enclosure and the second side faces into the enclosure; and a temperature sensor for measuring a temperature of the window, when the window is received by the bezel of the mounting plate, the temperature sensor being adapted to communicate with circuitry of the imaging device.

11. The assembly of claim 10, wherein the removable window comprises silicon.

12. The assembly of claim 10, wherein the removable window comprises plastic.

13. The assembly of claim 10, further comprising a removable seal member sized to be interposed between the retaining ring and the removable window, when the window is received by the bezel and the retaining ring is received by the outer shoulder.

14. The assembly of claim 13, wherein the mounting plate further includes an inner shoulder surrounding the bezel and being surrounded by the outer shoulder, the inner shoulder for receiving the seal member.

15. The assembly of claim 10, wherein:

the retaining ring, when received by the outer shoulder, holds the removable window in thermal conductive contact with the mounting plate, when the window is received by the bezel;

the temperature sensor comprises a direct contact type temperature sensor; and the temperature sensor is mounted on a circuit board, the circuit board being attached to the second side of the mounting plate so as to position the temperature sensor in thermal conductive contact with a portion of the second side of the mounting plate.

16. The assembly of claim 10, wherein:

the retaining ring, when received by the outer shoulder, holds the removable window in thermal conductive contact with the mounting plate, when the window is received by the bezel;

the temperature sensor comprises a non-contact type temperature sensor; and the temperature sensor is mounted on a circuit board, the circuit board being attached to the second side of the mounting plate so as to position the temperature sensor to receive infrared radiation from a portion of the second side of the mounting plate.

17. An industrial monitoring system, comprising:

a thermal imaging device;

an enclosure for containing and protecting the thermal imaging device, the enclosure comprising:

a mounting structure for securing the enclosure and the thermal imaging device in a fixed location;

a sidewall surrounding the imaging device;

a window assembly including a removable window, a temperature sensor, a removable retaining ring and a mounting plate attached to an end of the sidewall;

the window providing a passage for infrared radiation to the imaging device within the enclosure, and the temperature sensor for measuring a temperature of the window, when the window is received in the window assembly, the temperature sensor being adapted to communicate with the circuitry of the imaging device; and the mounting plate including a first side facing outward, a second side facing inward, a bezel formed in the first side, and an outer shoulder also formed in the first side and surrounding the bezel, the bezel for receiving the removable window, and the outer shoulder for receiving the retaining ring, such that the retaining ring holds the window against the bezel.

18. The system of claim 17, wherein the window assembly of the enclosure further includes a removable seal member sized to be interposed between the retaining ring and the removable window, when the window is received by the bezel and the retaining ring is received by the outer shoulder.

19. The system of claim 18, wherein the mounting plate further includes an inner shoulder surrounding the bezel and being surrounded by the outer shoulder, the inner shoulder for receiving the seal member of the enclosure.

20. The system of claim 17, wherein:

the retaining ring, when received by the outer shoulder, holds the removable window in thermal conductive contact with the mounting plate, when the window is received by the bezel;

the temperature sensor comprises a direct contact type temperature sensor; and the temperature sensor is mounted on a circuit board, the circuit board being attached to the second side of the mounting plate so as to position the temperature sensor in thermal conductive contact with a portion of the second side of the mounting plate.

21. The system of claim 17, wherein:

the retaining ring of the enclosure, when received by the outer shoulder, holds the removable window of the enclosure in thermal conductive contact with the mounting plate of the enclosure, when the window is received by the bezel;

the temperature sensor comprises a non-contact type temperature sensor; and the temperature sensor is mounted on a circuit board, the circuit board being attached to the second side of the mounting plate so as to position the temperature sensor to receive infrared radiation from a portion of the second side of the mounting plate.

* * * * *